US012676674B2

(12) United States Patent
Bagnell et al.

(10) Patent No.: US 12,676,674 B2
(45) Date of Patent: Jul. 7, 2026

(54) FREE SPACE OPTICAL COMMUNICATIONS SYSTEM INCLUDING OPTICAL PHASED ARRAY TELESCOPE

(71) Applicant: SRI International, Menlo Park, CA (US)

(72) Inventors: Marcus A. Bagnell, Menlo Park, CA (US); Nicole A. Heidel, Menlo Park, CA (US); Cale M. Gentry, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 144 days.

(21) Appl. No.: 18/712,203

(22) PCT Filed: Dec. 16, 2022

(86) PCT No.: PCT/US2022/053166
§ 371 (c)(1),
(2) Date: May 21, 2024

(87) PCT Pub. No.: WO2023/224662
PCT Pub. Date: Nov. 23, 2023

(65) Prior Publication Data
US 2025/0167890 A1 May 22, 2025

Related U.S. Application Data

(60) Provisional application No. 63/301,435, filed on Jan. 20, 2022.

(51) Int. Cl.
*H04B 10/00* (2013.01)
*G02B 6/293* (2006.01)
(Continued)

(52) U.S. Cl.
CPC ....... *H04B 10/118* (2013.01); *G02B 6/29301* (2013.01); *H04B 10/50* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| | | | |
|---|---|---|---|
| 5,126,869 A | 6/1992 | Lipchak et al. | |
| 5,969,812 A | 10/1999 | Carver | |

(Continued)

FOREIGN PATENT DOCUMENTS

| | | |
|---|---|---|
| CN | 105530044 B | 3/2018 |
| JP | 2005-176523 A | 6/2005 |

(Continued)

OTHER PUBLICATIONS

Sun et al., "Large-scale nanophotonic phased array", Jan. 10, 2013, vol. 493, Nature, pp. 195-199.
(Continued)

*Primary Examiner* — Daniel G Dobson
(74) *Attorney, Agent, or Firm* — McDonnell Boehnen Hulbert & Berghoff LLP

(57) ABSTRACT

Improved systems and methods for optical communications are provided that have reduced size, weight, and power use. Such system and methods can find, use between satellites or other distant systems that are in significant relative motion. Such embodiments include the use of a diamagnetically levitated magnetic actuator or other actuator to control the orientation of an optical phased array (OPA), thereby aiming the array at distant target systems. An OPA has reduced size and mass relative to traditional telescopes, providing similar beam apertures while having reduced size, weight, and cost of the OPA and associated actuators. The actuator allows the (Continued)

OPA to omit, or to include fewer, phase shifter elements than previous steerable OPA telescopes, reducing complexity', cost, and power requirements.

12 Claims, 7 Drawing Sheets

(51) Int. Cl.
  *H04B 10/118*       (2013.01)
  *H04B 10/50*        (2013.01)
  *H04J 14/00*        (2006.01)
(58) Field of Classification Search
  CPC .............. H04B 10/1127; H04B 10/114; H04B
          10/1141; H04B 10/1143; H04B 10/116;
          H04B 10/118; G02F 1/292; G02F 1/2955;
                  G02F 2203/24; G02B 27/0087
  See application file for complete search history.

(56)                References Cited

U.S. PATENT DOCUMENTS

| | | | |
|---|---|---|---|
| 6,501,782 | B1 | 12/2002 | Farmer |
| 7,095,925 | B2 | 8/2006 | Grunnet-Jepson et al. |
| 7,746,531 | B2 | 6/2010 | Mahajan et al. |
| 9,476,981 | B2 | 10/2016 | Yaacobi et al. |
| 9,897,892 | B2 | 2/2018 | Auxier et al. |
| 10,419,113 | B2 | 9/2019 | Dawson et al. |
| 2018/0031679 | A1 | 2/2018 | Lee |
| 2019/0353893 | A1* | 11/2019 | Wu ........................ G02B 26/02 |
| 2021/0215799 | A1* | 7/2021 | Sun ........................ G01S 7/4814 |
| 2023/0117688 | A1* | 4/2023 | Watts ...................... G01S 17/42 |
| | | | 385/14 |
| 2024/0272513 | A1* | 8/2024 | Liu ......................... G02F 1/292 |

FOREIGN PATENT DOCUMENTS

| | | |
|---|---|---|
| JP | 2020-506402 A | 2/2020 |
| JP | 2021-103147 A | 7/2021 |
| WO | 2003065080 A3 | 4/2004 |

OTHER PUBLICATIONS

The International Search Report (ISR) with Written Opinion for PCT/US2022/053166 dated Jan. 24, 2024, pp. 1-10.

Yang et al., "Phase coherence length in silicon photonic platform", Optics Express, Jun. 2015, 14 pages.

* cited by examiner

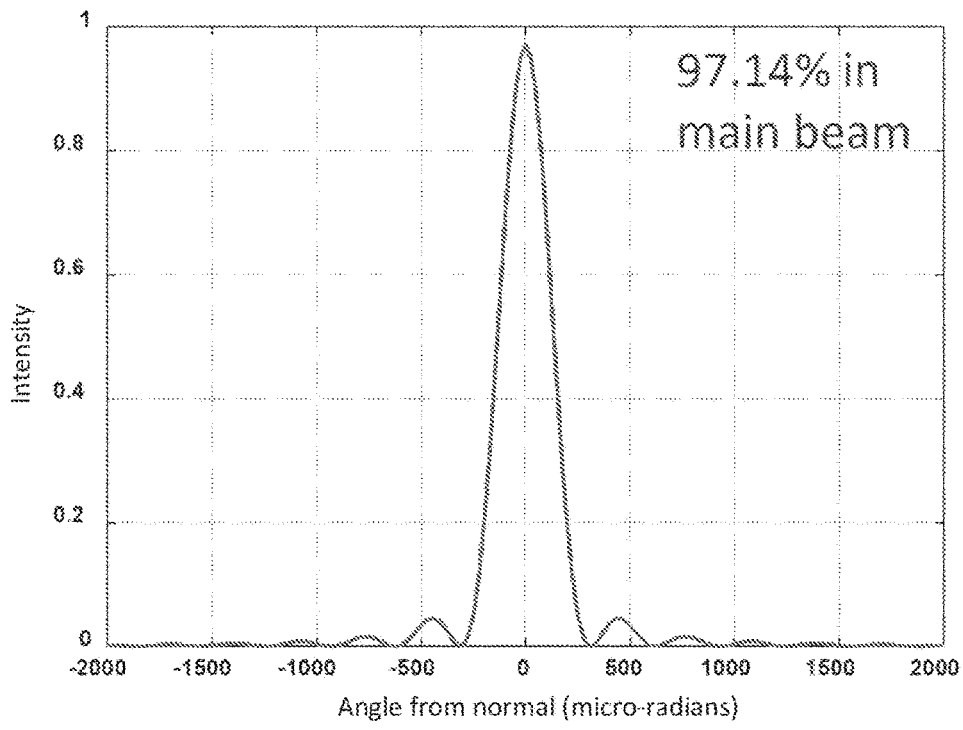
FIG. 4
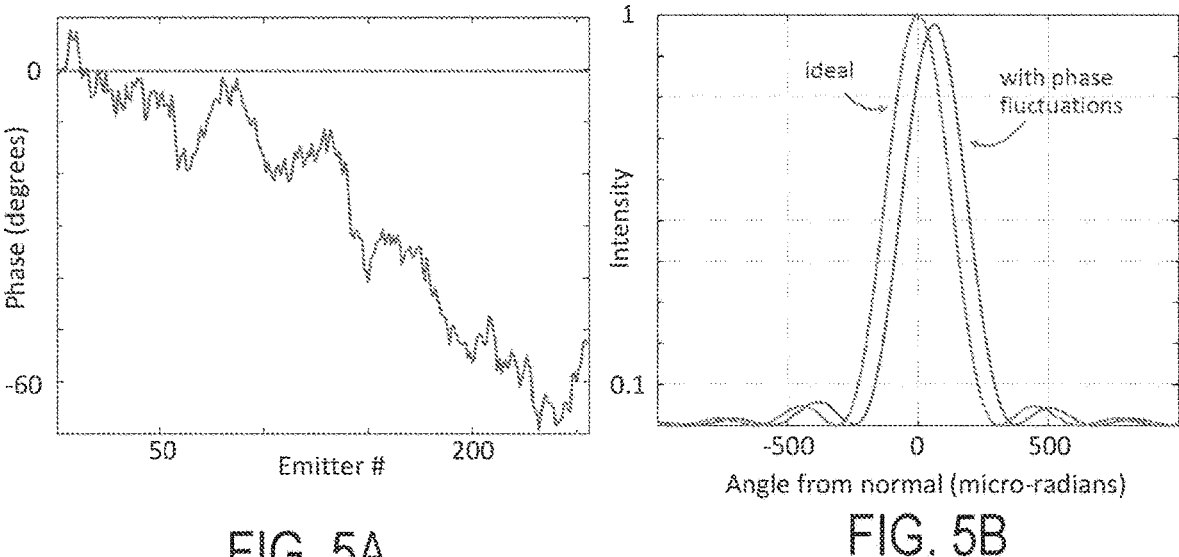
FIG. 5A                          FIG. 5B

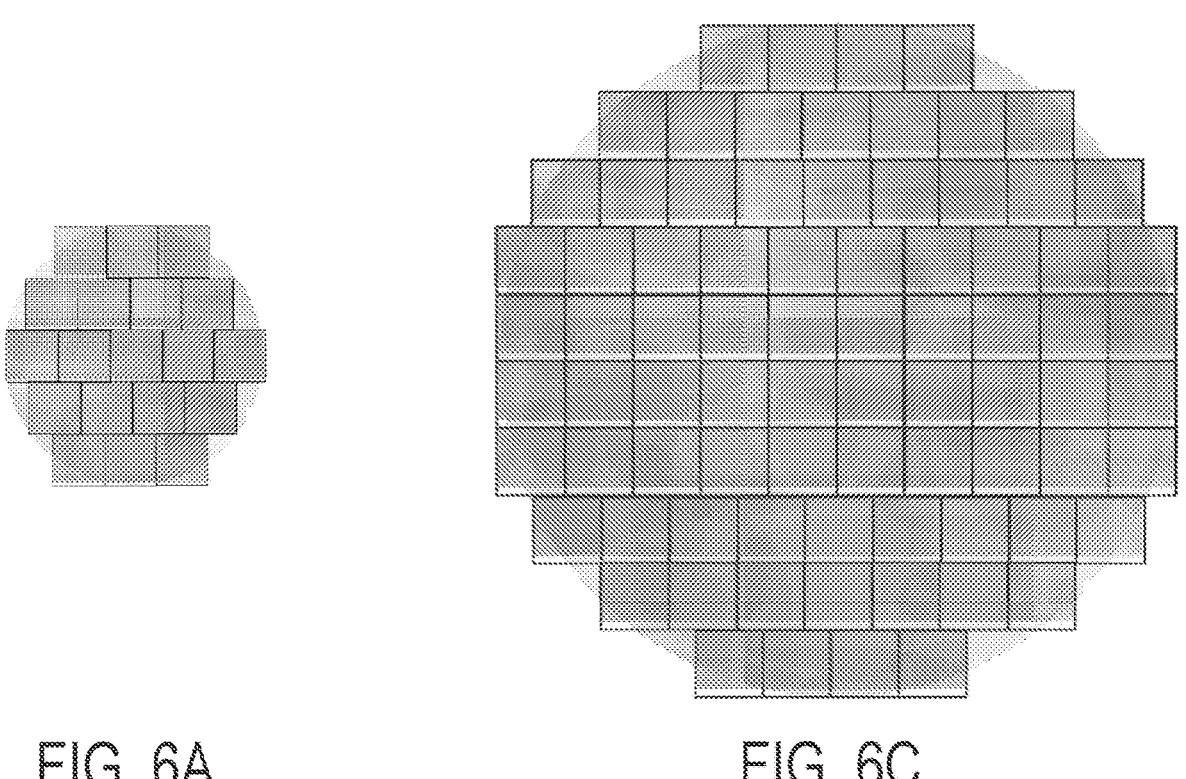
FIG. 6A
FIG. 6C
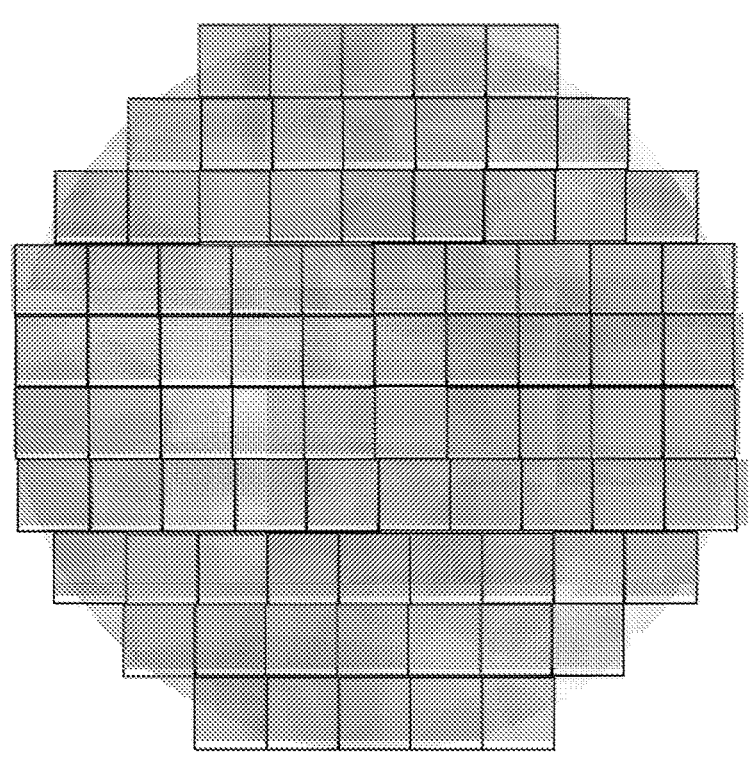
FIG. 6B

Angle from normal (micro-radians)

Angle from normal (micro-radians)

Figure 12:
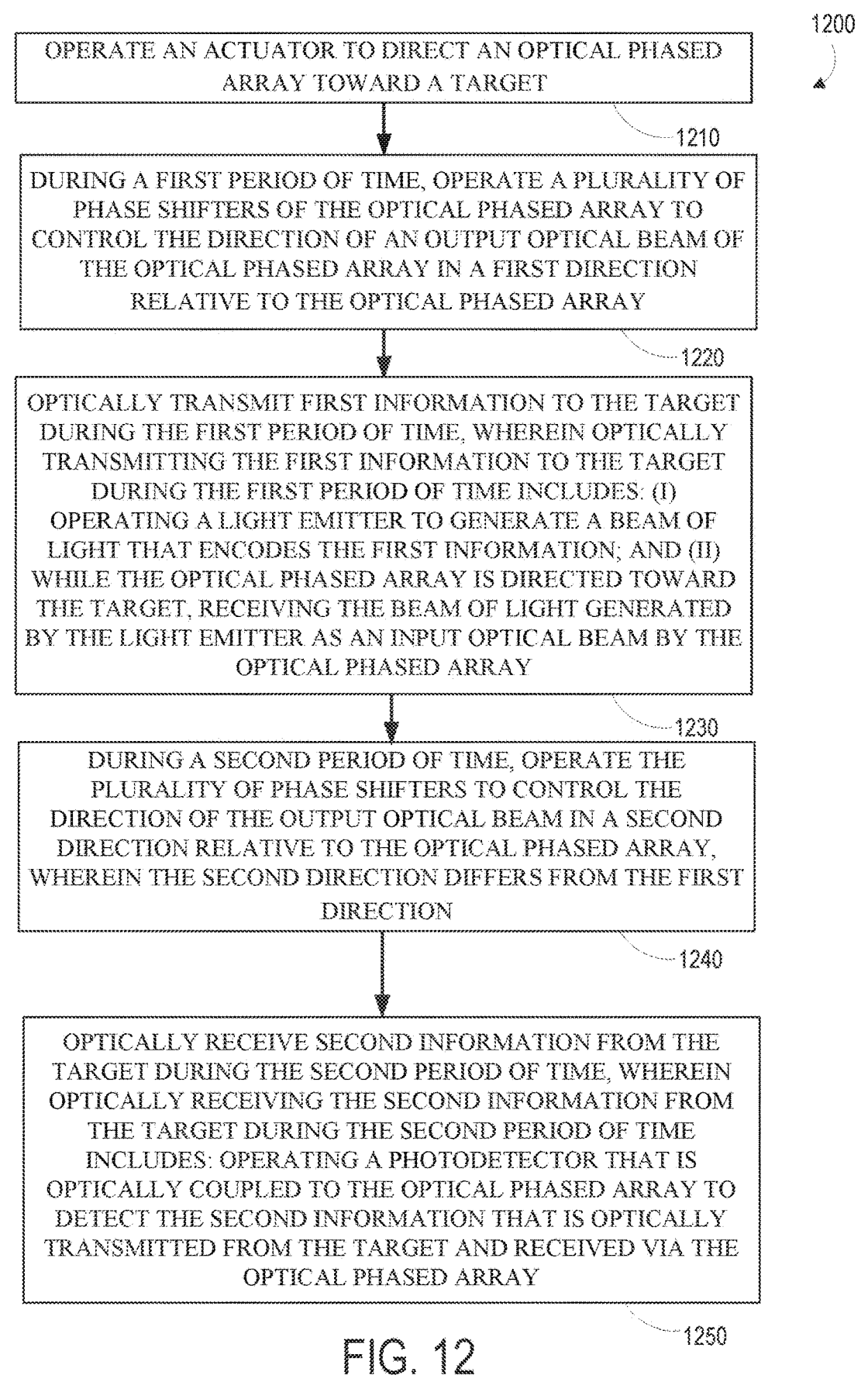

1200

OPERATE AN ACTUATOR TO DIRECT AN OPTICAL PHASED ARRAY TOWARD A TARGET

— 1210

DURING A FIRST PERIOD OF TIME, OPERATE A PLURALITY OF PHASE SHIFTERS OF THE OPTICAL PHASED ARRAY TO CONTROL THE DIRECTION OF AN OUTPUT OPTICAL BEAM OF THE OPTICAL PHASED ARRAY IN A FIRST DIRECTION RELATIVE TO THE OPTICAL PHASED ARRAY

— 1220

OPTICALLY TRANSMIT FIRST INFORMATION TO THE TARGET DURING THE FIRST PERIOD OF TIME, WHEREIN OPTICALLY TRANSMITTING THE FIRST INFORMATION TO THE TARGET DURING THE FIRST PERIOD OF TIME INCLUDES: (I) OPERATING A LIGHT EMITTER TO GENERATE A BEAM OF LIGHT THAT ENCODES THE FIRST INFORMATION; AND (II) WHILE THE OPTICAL PHASED ARRAY IS DIRECTED TOWARD THE TARGET, RECEIVING THE BEAM OF LIGHT GENERATED BY THE LIGHT EMITTER AS AN INPUT OPTICAL BEAM BY THE OPTICAL PHASED ARRAY

— 1230

DURING A SECOND PERIOD OF TIME, OPERATE THE PLURALITY OF PHASE SHIFTERS TO CONTROL THE DIRECTION OF THE OUTPUT OPTICAL BEAM IN A SECOND DIRECTION RELATIVE TO THE OPTICAL PHASED ARRAY, WHEREIN THE SECOND DIRECTION DIFFERS FROM THE FIRST DIRECTION

— 1240

OPTICALLY RECEIVE SECOND INFORMATION FROM THE TARGET DURING THE SECOND PERIOD OF TIME, WHEREIN OPTICALLY RECEIVING THE SECOND INFORMATION FROM THE TARGET DURING THE SECOND PERIOD OF TIME INCLUDES: OPERATING A PHOTODETECTOR THAT IS OPTICALLY COUPLED TO THE OPTICAL PHASED ARRAY TO DETECT THE SECOND INFORMATION THAT IS OPTICALLY TRANSMITTED FROM THE TARGET AND RECEIVED VIA THE OPTICAL PHASED ARRAY

FREE SPACE OPTICAL COMMUNICATIONS SYSTEM INCLUDING OPTICAL PHASED ARRAY TELESCOPE

CROSS-REFERENCE TO RELATED APPLICATIONS

This application is a U.S. national phase of International Application No. PCT/US2022/053166, filed on Dec. 16, 2022, which claims priority to U.S. Provisional Application No. 63/301,435, filed Jan. 20, 2022, both of which are incorporated by reference herein in their entirety.

STATEMENT REGARDING FEDERALLY SPONSORED RESEARCH OR DEVELOPMENT

This invention was made with government support under Contract Number N4175619C3028 awarded by Navy Engineering Logistics Office. The government has certain rights in the invention.

BACKGROUND

Unless otherwise indicated herein, the materials described in this section are not prior art to the claims in this application and are not admitted to be prior art by inclusion in this section.

For space applications, large laser beam diameters are used for long distance optical propagation by reducing loss from diffractive spreading of the beam. Because laser sources and detectors are often very small in diameter, a large telescope is typically used to provide conditioning optics and space for the beam to be resized. These large telescopes also include a pointing system to maintain links to other communications terminals, often a 2-axis gimbal which turns the entire assembly. Thus, in addition to the large space taken up by the telescope and weight of the optics and mounts, the steering mechanism is even larger to move the entire assembly.

Current practice commonly uses a telescope to resize the beam and a gimbal to hold and point the entire assembly. To provide space for the beam to expand, the telescope has a large volume of "empty space" internal to the assembly, increasing size.

For steering mechanisms, gimbals are high TRL (technology ready level) systems and provide very large field of regard, more than a hemisphere, and can reposition the beam fast enough for most applications. Unfortunately, the systems are also large, with assemblies not consistent with integration onto CubeSat type platforms. They also have coarse enough pointing that a secondary pointing mechanism, such as a fast-steering mirror, is also included. Other steering mechanisms, in general, sacrifice steering performance to obtain a smaller size and weight system.

SUMMARY

In a first aspect, a system is provided that includes: (i) an optical phased array, wherein the optical phased array comprises a first optical expansion element having at least two emitter gratings and a beam splitter, wherein the at least two emitter gratings are configured to receive, via the beam splitter, respective portions of an input optical beam and to emit respective portions of a combined output optical beam of the optical phased array, and wherein the input optical beam has a first aperture that is less than a second aperture of the combined output optical beam, and wherein a relative phase between light emitted from each of the at least two emitter gratings is static; and (ii) a steering actuator mechanically coupled to the optical phased array and configured to adjust an orientation of the optical phased array.

In a second aspect, a method is provided that includes: (i) operating a steering actuator to direct an optical phased array toward a target, wherein the steering actuator is mechanically coupled to the optical phased array and configured to adjust an orientation of the optical phased array; (ii) during a first period of time, operating a plurality of phase shifters of the optical phased array to control the direction of an output optical beam of the optical phased array in a first direction relative to the optical phased array; (iii) optically transmitting first information to the target during the first period of time, wherein optically transmitting the first information to the target during the first period of time comprises: (a) operating a light emitter to generate a beam of light that encodes the first information; and (b) while the optical phased array is directed toward the target, receiving the beam of light generated by the light emitter as an input optical beam by the optical phased array; (iv) during a second period of time, operating the plurality of phase shifters to control the direction of the output optical beam in a second direction relative to the optical phased array, wherein the second direction differs from the first direction; (v) optically receiving second information from the target during the second period of time, wherein optically receiving the second information from the target during the second period of time comprises: operating a photodetector that is optically coupled to the optical phased array to detect the second information that is optically transmitted from the target and received via the optical phased array.

In a third aspect, an article of manufacture is provided that includes a computer-readable medium, having stored thereon program instructions that, upon execution by a computing device, cause the computing device to perform operations to affect the method of the second aspect.

In a fourth aspect, a system is provided that includes: (i) an optical phased array configured to receive an input optical beam and to emit an output optical beam, wherein the input optical beam has a first aperture that is less than a second aperture of the output optical beam; and (ii) a steering actuator coupled to the optical phased array and configured to adjust an orientation of the optical phased array, wherein the steering actuator comprises a magnetic bearing, wherein the magnetic bearing comprises a plurality of magnets and a layer of diamagnetic material configured to repel the plurality of magnets.

BRIEF DESCRIPTION OF THE DRAWINGS

FIG. 4 depicts the angular intensity profile of a beam emitted from an example telescope as described herein.

FIG. 5A depicts simulated varying phase delays across emitters of an example telescope as described herein.

FIG. 5B depicts the angular intensity profile of a beam emitted from an ideal example telescope as described herein and from an example telescope having the varying phase delays across emitters as depicted in FIG. 5A.

FIG. 6A depicts an example arrangement of optical phased array elements to form a composite telescope.

FIG. 6B depicts an example arrangement of optical phased array elements to form a composite telescope.

FIG. 6C depicts an example arrangement of optical phased array elements to form a composite telescope.

FIG. 12 depicts aspects of an example method.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

It is desirable in a variety of applications to communicate at high bandwidth between distantly-separated systems that are moving relative to each other. For example, to provide communications between satellites in a satellite constellation that is configured to provide radio-based data service (e.g., Internet access) to systems on the earth, the bulk of the communications traffic can be transmitted through the in-space satellites to relatively few surface-based systems. Such high-bandwidth communications are advantageously provided by line-of-sight optical communications links. However, these optical communications links typically require steering of the optical beams transmitted to other systems, in order to account for relative motion and rotation (e.g., of satellites in their orbits). Additionally, at large distances (e.g., as between satellites in orbit), diffractive spreading of such optical beams can become a significant factor, which leads to the use of steerable large-aperture (e.g., centimeters or more) telescopes or other optical systems to adapt the small aperture of onboard light emitters/detectors to the large aperture beams that can account for diffractive beam spreading at such distances. Steering of such large-aperture beams can be accomplished by pointing a telescope or other optical system used to generate the beams (e.g., an aiming mirror mounted onto a galvanometer), steering the entirety of such an optical system or a portion thereof, and/or steering the body of the satellite or other platform as a whole.

Figure 1:
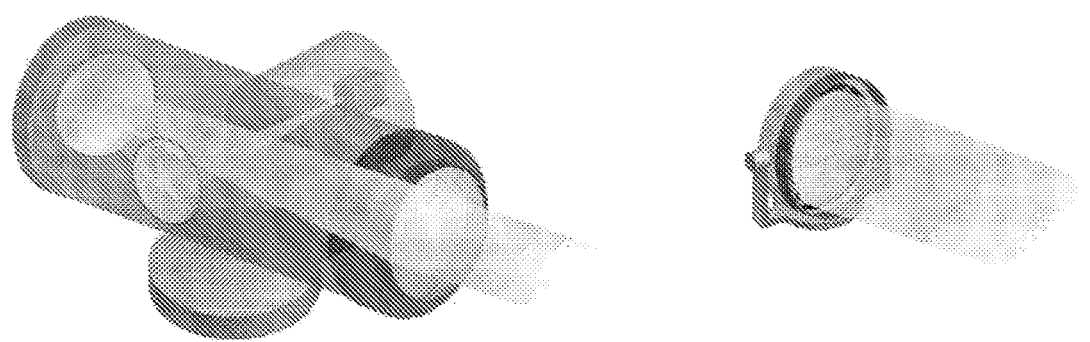
FIG. 1 depicts a comparison of a reflector-type telescope using large discrete mirrors with an example embodiment of the OPA (optical phased array)-containing telescope as described herein.

As noted above, conventional telescopes that rely on discrete reflective/refractive elements separated by large open-space volumes (through which light energy received by/transmitted from the telescope passes) exhibit large volumes, large masses, and large rotational inertias. This can result in more expensive, heavy, and expensive steering mechanisms (e.g., higher-rated servomotors) and/or can make the use of such conventional telescopes incompatible with volume, mass, cost, thermal, and/or power-constrained applications (e.g., with the small volume, mass, cost, and power and thermal budgets of CubeSats or other small satellite systems). Described herein are optical phased array (OPA)-containing systems that can convert an optical beam from a small, fiber optic input to a many-centimeters-in-diameter beam using a substantially planar structure. By replacing a conventional telescope with such a lightweight, substantially planar optical system, the 2D form factor of the OPA provides significant size, weight and power reduction compared to traditional telescopes and with respect to the corresponding steering systems that are typically used to orient such optical systems (e.g., according to the speed and accuracy requirements of a free space optical communications terminal). FIG. 1 compares a conventional telescope (on the left) that includes large empty spaces for beam propagation and several mirrors, mounts, and integrated structures with an example OPA embodiment as described herein (on the right). Such an OPA-containing system is more compact and lighter weight, leading to direct savings on mass, rotational inertia, and volume, as well as indirect savings as the mass, volume, power requirements, and cost of the associated steering mechanisms can also be reduced.

In other optical phased array beam-forming systems, the phased array includes a plurality of emitters (e.g., optical gratings) for emitting portions of a beam, with the phase of the light emitted from each emitter controlled by a respective phase shifting element (e.g., a portion of a waveguide that can be heated to control the relative phase delay exhibited by the waveguide). The phase delay for each emitter is then controlled in a specified pattern to control the overall direction or other properties of the composite beam emitted from such a solid-state steerable phased array (being the combination of the light emitted from each of the emitters at their respective different controlled phase delay relative to a common optical input to the phased array). This leads to a fast, non-mechanical beam steering ability.

However, conventional approaches to produce a large-aperture (e.g., more than a centimeter diameter aperture) optical beam from such a phased array, while also achieving a wide field of regard with respect to the steerability of the beam, use a great many very small individual emitters. This results in a very complex device, which includes many (e.g., thousands or millions) phase shifters, each of which is powered and controlled to generate the beam. Additionally, the steerable beam emitted from such a phased array is likely to have low efficiency due to emission of optical energy in significant side-lobes (which may be related to the spacing between the individual emitters of such a phased array). The efficiency of such a phased array is further reduced by the power used to operate the phase shifters of the array (e.g., heaters for controlling the temperature-dependent phase delay of waveguides thereof).

Embodiments described herein provide improvements over conventional steerable phased arrays by using one or more 'static' sub-OPAs (or "optical expansion elements") for which the relative phasing between different optical emitters is not controlled. Each optical expansion element includes a number of emitters (e.g., emitter gratings) that are fed, via a set of mode expanders (e.g., tapers) and optical splitters, from a single input waveguide such that the phasing between light output from (or input to) each emitter, relative to the phasing of corresponding light input to (or output from) the input waveguide, is not independently controllable and does not significantly vary over time between the emitters. Accordingly, the beam direction, aperture, and other optical properties of light emitted from (or received via) such an optical expansion element is non-controllable and is set at the time of manufacture. By eliminating the steering function from the individual optical expansion elements, their design and fabrication is also simplified. This allows such OPAs as described herein to be used for near-term integration into size, weight and power (SWaP)-constrained platforms such as CubeSats, aircraft, or handheld devices. Instead, the steering function can be provided, as described above, by mechanical actuators. The relative decrease in size, weight, and complexity of such non-steerable OPAs leads to reduction in size, weight, and cost relative to the use of steered conventional telescopes for beam aperture expansion.

An improved OPA as described herein could be composed of a single such optical expansion element. Alternatively, an OPA could be formed from a plurality of such optical expansion elements mounted together (e.g., onto a common substrate that is steered by an actuator) and fed by a single optical waveguide (coupled, e.g., to a light emitter and a light detector to facilitate use of such a composite OPA for optical communications). The properties of a composite beam emitted from such an OPA could be controlled by controlling the phasing of each of the optical expansion elements relative to each other. This could be done, e.g., by attaching a static phase plate to each of the optical expansion elements at the time of manufacture such that the individual portions of light emitted from each optical expansion element are properly phased to combine into a beam whose direction can be steered by mechanically rotating the OPA. Additionally or alternatively, phase shifters or other path length control mechanisms can be provided, one for each optical expansion element, to improve the emitted composite beam characteristics (e.g., to account for manufacturing variability in the optical expansion elements) and/or to provide some degree of non-mechanical (e.g., solid-state) beam steering. With the number of such phase shifters significantly reduced (from thousands or millions per OPA, to a few tens, one for each optical expansion element of the OPA) such an OPA can be much more efficient than prior steerable phased arrays. Additionally, the beam characteristics of the light emitted from each such optical expansion element are significantly improved relative to prior steerable phased arrays (e.g., related to improved spacing and size of the emitters, related to the omission of corresponding phase shifters for each emitter), exhibiting no or significantly reduced side-lobe emissions. Accordingly, the composite beam emitted as the combination of the sub-beams emitted from an assembly of such optical expansion elements is also improved with respect to spurious side-lobe emissions, resulting in increased efficiency.

By eliminating or significantly reducing the steering function relative to OPAs currently under development, their design and fabrication are greatly simplified while increasing the beam quality and the efficiency of beam generation. Instead of the thousands or millions of very fast phase control mechanisms required for steerable OPAs, the disclosed embodiments significantly reduce that number. For example, the number of phase shifters could be reduced to a few tens of phase control mechanisms (equal to the number of optical expansion elements used to form the OPA) to correct for fabrication errors. Such phase shifters could also operate with very little or possibly no control feedback once set for the correct path length corrections used to generate a beam of the desired properties. Alternatively, as noted above, the phase shifter could be controlled to slightly adjust the beam steering in order to, e.g., allow for slightly different transmit and receive beam directions through the same OPA without mechanically steering the OPA between transmit and receive. This could provide benefits when communicating with distant satellites (or other target communications systems) by allowing the OPA to transmit in a "point ahead" direction in order to compensate for speed of light delays when transmitting to such distant satellites.

In example embodiments of OPAs disclosed herein, the OPA is able to change a beam aperture for a transmitted signal (e.g., from a laser or other light source) from several micrometers in diameter (e.g., a 5 micron-diameter beam of 850 nm light emitted from a single-mode fiber, or a 10 micron-diameter beam of 1550 nm light emitted form a single-mode fiber) to several centimeters (e.g., 2.5 centimeters, 5 centimeters) in diameter (or to do the reverse for received light) in a substantially planar, low weight structure. This results in a significant reduction in the size and weight of the beam expansion system, from a ~10 cm path in a conventional telescope for a 3 cm aperture, to under a millimeter of thickness for the OPA. Additionally, because of the way the OPAs described herein shape the output beam, its "top-hat" beam shape will exhibit less divergence than traditional telescopes' Gaussian beam shape. Additionally, mechanical actuator(s) used to steer the beam (by controlling the orientation of the OPA) can then be dramatically reduced in size, mass, and power as well, for example, because it does not contain or interface with a large conventional telescope system and further because the mass and/or rotational inertia of the OPA is much less than such conventional telescopes.

An optical expansion element as described herein, which can form all or part of an OPA composed of one or more such elements, could be configured in a variety of ways such that at least two emitters (e.g., emitter gratings) of the optical expansion element receive respective portions of an input optical beam to the optical expansion element and emit respective portions of a combined output optical beam of an OPA that includes the optical expansion element. This can include the at least two emitters receiving their respective portions of the input optical beam via a beam splitter of the optical expansion element. Accordingly, a relative phase between light emitted from each of the at least two emitters of the optical expansion element is static and non-controllable (though the relative phase between the input optical beam and the emitters could be controllable by a single phase shifter of the optical expansion element operating to add an adjustable phase delay in common to all of the emitters of the optical expansion element). Such a beam splitter could be configured to split a single input optical beam (e.g., received by a waveguide of the element that also includes a controllable phase shifter) across a plurality of emitters of the element. For example, the beam splitter could include a plurality of two-way beam splitters arranged as a binary tree to split the input optical beam 256 ways across 256 emitters of the optical expansion element.

Figure 2:
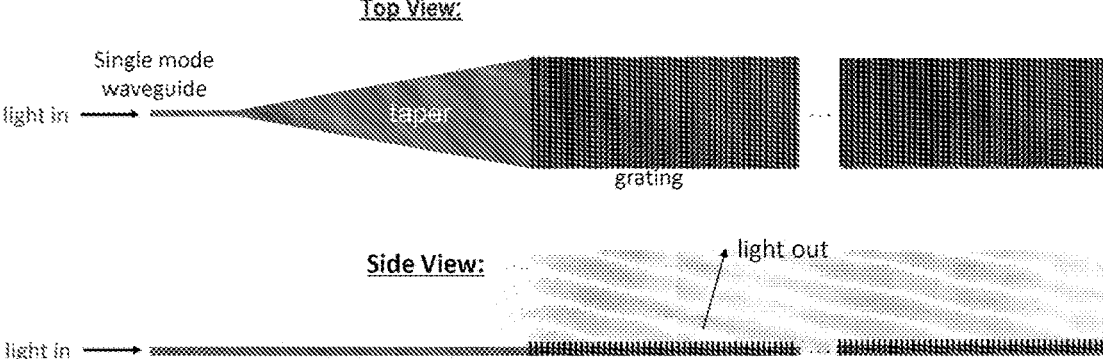
FIG. 2 depicts an example embodiment of aspects of an optical phased array element of an OPA-containing telescope as described herein.

Each emitter could be a long emitter grating configured to receive input light and emit it along the length of the grating in a pattern that forms respective portions of a beam of light emitted from the element. FIG. 2 depicts top and side views of such an emitter grating of an optical expansion element. As shown, an input waveguide to the emitter from the beam splitter (e.g., a "single mode waveguide") is optically coupled to the emitter grating ("grating") via an optical mode expander (for, example, a ("taper") as depicted in FIG. 2). The emitter includes a plurality of gratings formed into a waveguide such that each emitter emits a respective portion of the light in the waveguide. The geometry (width, thickness), optical properties (e.g., index of refraction) and number of the gratings and the geometry (width, thickness, length) and optical properties (e.g., index of refraction) of the waveguide of the emitter can be specified such that the light emitted from each grating constructively interferes, forming a beam of light emitted from the emitter. A plurality of such emitters (and associated mode expanders (e.g., tapers), waveguides, beam splitters, etc.) could be formed parallel to each other across a single optical expansion element, thereby providing an optical expansion element that emits a combined optical beam formed from the respective portions of light emitted from each of the emitters of the element.

Note that examples are often described throughout this disclosure depicting an OPA or optical expansion elements thereof receiving light from an input beam (e.g., from an input single-mode waveguide coupled to a laser or other light emitter) having a first aperture and emitting that received input beam as an output combined beam having a second, wider aperture. It is important to note that this direction of optical propagating (input of a small-aperture beam into the OPA, emission of a wider-aperture beam from the OPA) is intended as a non-limiting illustration of the optical properties of such OPAs and related apparatus. Such OPAs and related apparatus can also operate in the reverse, to receive light from the environment via the OPA (e.g., from a wide-aperture beam transmitted from a remote system to the OPA) and to direct such received light to the 'input' of the OPA (e.g., as a much smaller-aperture beam that can be directed to a silicon avalanche photodiode or other light-detecting element(s)).

Figure 3:
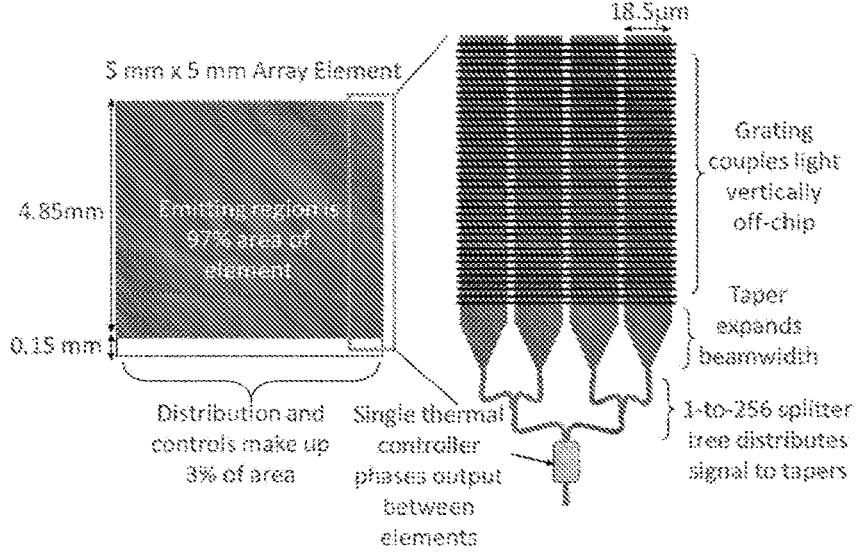
FIG. 3 depicts an example embodiment of an optical phased array element of an OPA telescope as described herein.

An example embodiment of the detailed elements of an optical expansion element having multiple such emitter gratings (which may form all or a portion of an OPA as described herein) is shown in FIG. 3. Optical signals are coupled into/out of the element from an off-element light source/light detector (e.g., from a directly modulated laser diode via an optical fiber(s)). An external beam splitter tree (not shown) may distribute the signal to the inputs of each element of a multi-element OPA. The illustrated single optical expansion element includes a single phase shifter (e.g., a thermal phase shifter) followed by a beam splitter tree and a set of mode expanders (e.g., tapers) to expand the beamwidth from the beamwidth in the beam splitter to the width of the emitter gratings. Vertical grating couplers then output a two-dimensional beam that is substantially uniform in amplitude and phase. The element size can be expanded along the length of the emitter gratings such that phase of the emitted light is stable along the length of the emitter, resulting in the emitted beam remaining substantially uniform. The obtainable length of such emitters can be increased by improved fabrication tolerances. For example, fabrication tolerances used to form practical elements for experimental verification were able to form emitter gratings having lengths of nearly 5 millimeters.

Note that the incorporation of the phase shifter onto the optical expansion element is intended as a non-limiting example embodiment; it is also possible for such a phase shifter to be formed separately from the optical expansion element.

Where the OPA is formed from multiple such optical expansion elements, thermal (or otherwise configured)

phase shifters can be controlled such that their outputs are combined coherently. This can include adjusting the phase delay for each optical expansion element to compensate for fabrication length differences between the elements. For example, a 5-cm array can be created by approximately 80 optical expansion elements, each having the approximately 5 mm×5 mm dimension that can be cost-effectively manufactured while still maintaining acceptable beam uniformity. Such a relatively low number of phase shifters (corresponding to the number of optical expansion elements) is easily managed with a slow control loop to account for any temperature drift.

FIG. 4 depicts the angular dependence of beam intensity as emitted from such an optical emitter element. The example optical emitter element used to generate this result was configured as depicted in FIG. 3, with 256 emitter gratings, each 18.5 microns wide and 4.85 millimeters long, spaced with a center-to-center spacing of 19.5 microns, and emitting light at 1550 nanometers. As shown, the main beam emitted from such an optical expansion element includes more than 97.14% of the total optical output of the element.

The number of emitter gratings, their length, and their width can be selected to increase the overall efficiency and light output of the individual optical expansion elements. For example, fewer, wider emitters use less element area for beam splitters, but also use longer mode expanders to adapt the mode of the waveguide coming from the beam splitter to the width of the emitters. Conversely, narrower emitters use shorter mode expanders but also have more element area devoted to beam splitters. In practice optical expansion elements with dimensions similar to those described above are able to devote more than 97% of the area of the optical expansion element to the emitter gratings (with less than 3% of the area of the optical expansion elements used for mode expanders and beam splitters). Other configurations are able to keep the ratio of element area occupied by emitter gratings to the element area occupied by mode expanders and beam splitters at greater than 19:1.

In practice, the relative phase between light received by the emitter gratings of an optical expansion element will vary across the element. These phase differences from ideal (i.e., a constant uniform phase across all of the emitters) can result in degradation of the quality of the beam emitted from the element. This degree of the degradation was simulated for a 256-emitter element having 18.5 micron wide emitters and a fabrication coherence length of 5 millimeters. FIG. 5A depicts the simulated phases of each of the emitters relative to the input beam phase (at 0 degrees), simulated using a random walk. FIG. 5B illustrates the angular dependence of beam intensity as emitted from such an optical emitter element (which exhibits the variation in phase across emitters as shown in FIG. 5A). As shown, this imperfect beam profile ("with phase fluctuations") deviates only slightly from the ideal beam profile ("ideal") that would be emitted from a hypothetical optical expansion element that exhibited no phase variation from emitter to emitter.

An improved OPA as described herein can be formed from a single such optical expansion element or multiple such elements. An OPA can be formed from an array of multiple optical expansion elements in order to provide a larger aperture beam formed from the combined output of the multiple elements. The multiple elements of such a composite OPA can be fed from the same input beam or waveguide (e.g., coupled to a light emitter and/or light detector used to effect long-range optical communication via the OPA) via one or more beam splitters. The phase of that common input (or output) light relative to each of the individual optical expansion elements can be controlled by respective phase shifters (e.g., a phase shifter formed on each of the expansion elements) in order to improve a quality of the combined beam emitted from the OPA (e.g., to account for fabrication variations between the elements, to account for non-uniform heating across the OPA), to effect some level of non-mechanical steering of the combined beam (e.g., to vary between a 'transmit direction' where a distant satellite will be when it receives a transmitted beam and a 'receive direction' where a distant satellite was when it transmitted a beam), or to provide some other benefits. In such examples, a mechanical actuator adjusting the mechanical orientation of the entire array could be operated to effect coarse control of the direction of the beam emitted therefrom across a large range of angles while operation of the phase shifters to adjust the relative phasing of the light emitted from each of the optical expansion elements could be used to effect fine control of the direction of the beam across a relatively smaller range of angles (e.g., across a range less than 1 degree). Additionally or alternatively, static phase plates or other materials could be disposed on the optical expansion elements to account for fabrication differences or to otherwise tailor the properties of the combined beam emitted therefrom.

The optical expansion elements of such a composite OPA can be arranged in a variety of ways in order to provide a combined beam having a larger aperture. The multiple optical expansion elements of such an OPA can be mechanically mounted to a substrate (e.g., a substrate that is coupled to a two-axis actuator configured to steer the OPA) using adhesives or by some other means. The pattern and number of the optical expansion elements of such a composite array could be specified in a variety of ways. For example, FIG. 6A shows an OPA formed from 19 optical expansion elements, providing a combined beam with an aperture of 2.5 centimeters. In another example, FIG. 6B shows an OPA formed from 80 optical expansion elements, providing a combined beam with an aperture of 5 centimeters. In yet another example, FIG. 6C shows an OPA formed from 82 optical expansion elements, providing a combined beam with an aperture of 5 centimeters.

With each element associated with a respective resistive-heating phase shifter (e.g., formed on the respective element), the overall power draw of the OPA is significantly reduced compared to a fully-steerable phased array (i.e., an array wherein each emitter grating or other optical emitter element is coupled to a respective phase shifter), because the total number of such phase shifters is significantly reduced from the thousands or millions used in a per-emitter phase shifter arrangement. For example, if each phase shifter draws 10 mW of power, then the OPA of FIG. 6A only draws 190 mW, the OPA of FIG. 6B only draws 800 mW, and the OPA of FIG. 6C only draws 820 mW.

Figure 7:
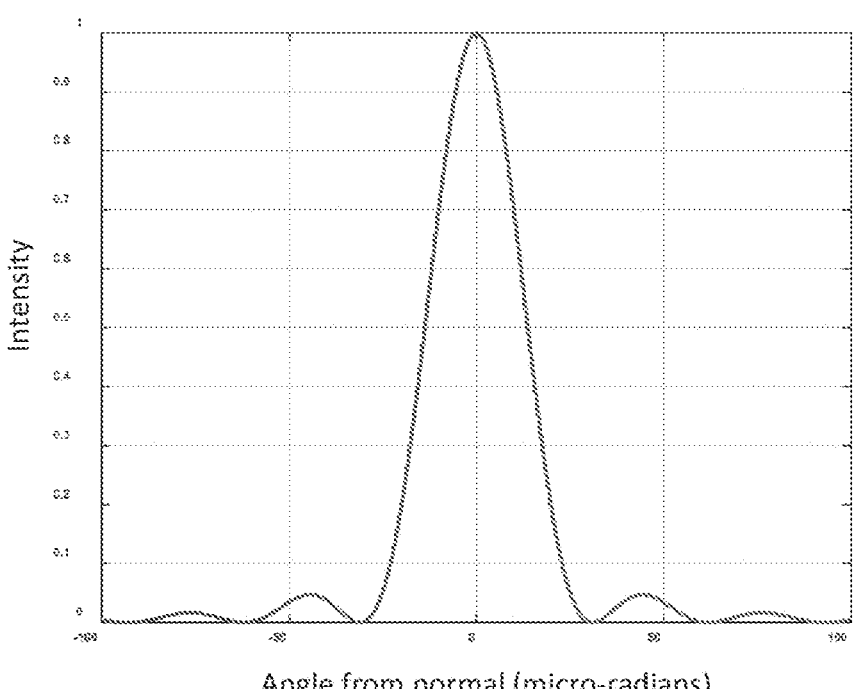
FIG. 7 depicts the angular intensity profile of a beam emitted from an example telescope as described herein.
Figure 8:
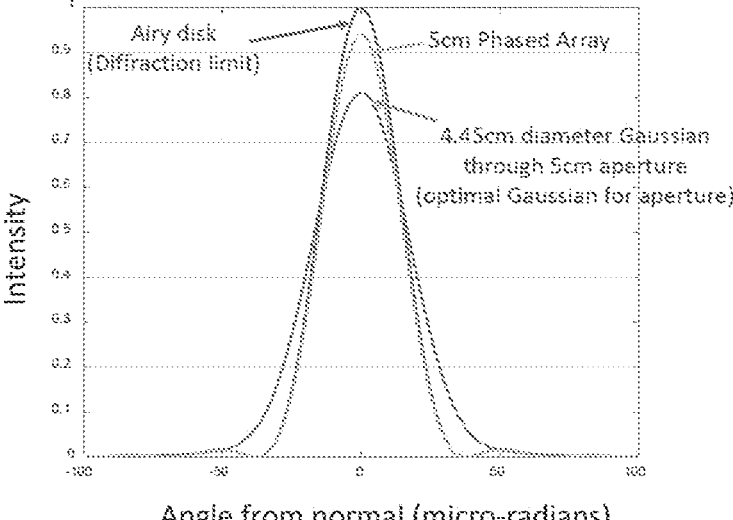
FIG. 8 depicts the angular intensity profile of a beam emitted from an example telescope as described herein compared against alternative angular intensity profiles.

Such an OPA, formed from a plurality of the optical expansion elements described herein, exhibits a variety of benefits with respect to the quality of the beam emitted therefrom when compared to phased arrays having per-emitter phase shifters (decreased side-lobe mission compared to such phased arrays) and when compared to conventional telescopes. FIG. 7 depicts the angular dependence of beam intensity as emitted from the 82-optical emitter element-OPA depicted in FIG. 6C. FIG. 8 depicts the angular dependence of beam intensity as emitted from 82-optical emitter element-OPA depicted in FIG. 6C ("5 cm phased array") and provides for comparison the theoretical diffraction-limited ideal beam profile emitted from a 5 cm aperture ("Airy disk") and the beam profile emitted from a conventional telescope having a 5 cm aperture, emitting the optical 4.45 cm Gaussian beam profile through that aperture ("4.45 cm diameter Gaussian through 5 cm aperture). As shown, the multiple-element composite OPA significantly outperforms the conventional telescope and approaches the theoretical diffraction-limited performance.

The reduced size, weight, and rotational inertia of such an OPA also provides indirect benefits by relaxing the constraints on an actuator (e.g., with respect to torque, speed, accuracy, etc.) that is used to steer such an OPA, relative to steering a conventional telescope, in order to achieve the same speed and accuracy of the steering. This results in reductions in the size, weight, cost, complexity, and power requirements of such steering.

A steering actuator used to steer an OPA as described herein could be configured in a variety of ways. In some examples, the actuator could include two or more servos, motors, or other actuators mechanically coupled to the OPA in order to steer the OPA. In some examples, the actuator could include a magnetic bearing and a plurality of coils. The magnetic bearing can include a plurality of magnets and a layer of diamagnetic material configured to repel the plurality of magnets, thereby forming a low (or no) friction magnetic bearing between the rotor of the actuator (to which the OPA is coupled) and the stator of the actuator (which is coupled to the rest of a satellite or other system of which the actuator and OPA are a part). Coils disposed in the portion of the actuator opposite the magnets (e.g., coils of the stator, where the permanent magnets are disposed in the rotor and the diamagnetic material is disposed in the stator) could then be driven by currents to exert forces onto the magnets, thereby adjusting an orientation of the optical phased array mounted to the actuator.

Figure 9:
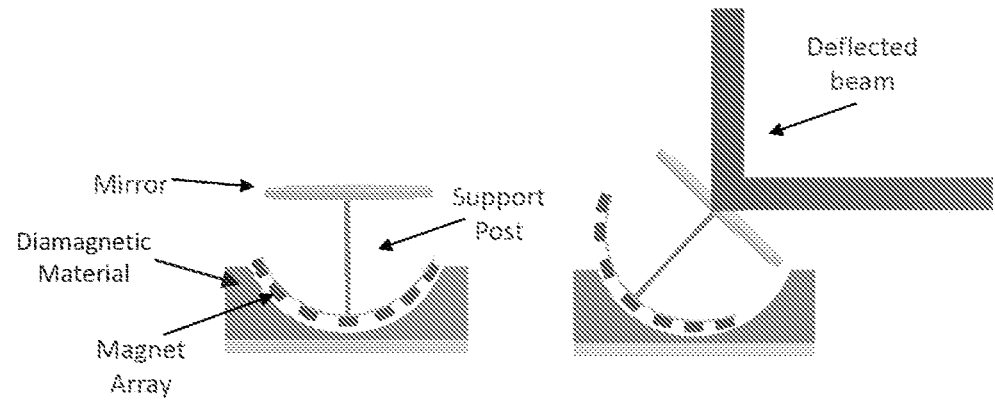
FIG. 9 depicts aspects of an example diamagnetically-levitated, magnetically-controlled actuator.

FIG. 9 depicts, by way of example, aspects of such a diamagnetically-levitated actuator. The actuator includes a plurality of permanent magnets ("Magnet Array") arranged along a hemispherical surface and disposed within a hemispherical depression in a diamagnetic material ("Diamagnetic Material," e.g., pyrolytic carbon) such that the rotor of the actuator (which includes the permanent magnets) is magnetically repelled from the diamagnetic material, thereby providing a magnetic bearing therebetween. In the example depicted in FIG. 9, the actuator is coupled to a single mirror, and the actuator can be operated to control the orientation of the mirror. This can be done, e.g., to control the direction of deflection of a beam of light, as shown in the right portion of FIG. 9 ("Deflected beam"). Such an actuator may, instead, have an OPA as described herein coupled thereto, to allow the actuator to be operated to control the orientation of the OPA and thus to control the orientation of an optical beam emitted therefrom/received thereby.

Figure 10:
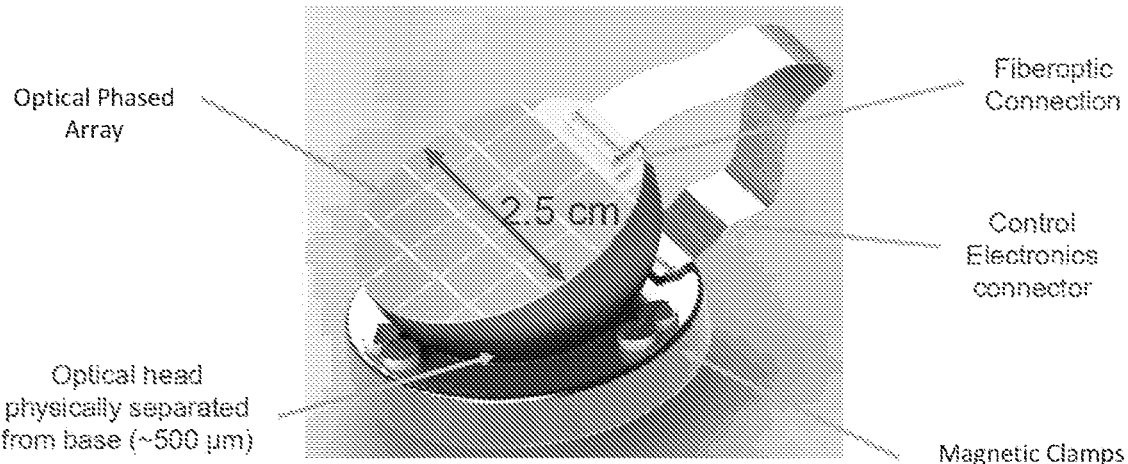
FIG. 10 depicts an example telescope and diamagnetically-levitated, magnetically-controlled actuator thereof.

FIG. 10 shows an example communications system that includes an OPA as described herein ("Optical Phased Array," which is formed from multiple optical expansion elements) and that is coupled to a diamagnetically levitated actuator. In particular, the OPA is mounted to a hemispherical rotor of the actuator, which includes a plurality of permanent magnets. The hemispherical rotor is disposed within a hemispherical depression of the actuator's stator that is formed from a diamagnetic material, thereby providing a magnetically-supported separation between the rotor and stator of approximately 500 microns. A plurality of coils is disposed in the stator (e.g., within or behind the diamagnetic material, not shown) through which currents can be passed to exert magnetic forces on the permanent magnets in the rotor, thereby controlling the orientation of the OPA.

In an example implementation of the actuator shown in FIG. 10, the overall weight of the actuator (including the carbon fiber diamagnetic head, magnets, encoders, peripheral electronics, fixtures, circuit boards, drive coils, coil driver, and microcontroller) was only 97 grams. This actuator and associated controller were configured to operate in a "fast" mode to initiate a link (e.g., to quickly orient from one target to another target) and in a "slow" mode to maintain the link with a lower power draw. That system was able to operate with less than 231 mW in the fast mode and less than 82 mW in the slow mode.

The actuator of FIG. 10 also shows several magnetic clamps ("Magnetic Clamps") that can be actuated to mechanically secure the rotor. This can be done, e.g., to prevent damage or misalignment of the rotor (e.g., exiting the hemispherical depression of the stator) during transport (e.g., during launch of a satellite containing the OPA and actuator), or during some other periods when it would be advantageous to mechanically secure the rotor and OPA (e.g., when the OPA is not being used, to conserve power in the coils used to orient the rotor and/or to maintain the rotor within the hemispherical depression of the stator). Such magnetic clamps could be operable multiple times (e.g., by being drivable between a 'locked' and an 'unlocked' state by a motor or other actuator) or may be operable once in order to save on weight, cost, or other factors (e.g., to secure the rotor only prior to being actuated to release the rotor, e.g., by applying heat or magnetic fields to decouple the clamp(s) from the rotor and/or to diminish or eliminate a magnetic field of the clamp(s)).

The OPA is electrically and optically coupled to the rest of the communications system (e.g., to a laser or other light emitter, to a light detector, to control electronics for operating phase shifters of the optical expansion elements of the OPA) via an electrical cable ("Control Electronics connector") and an optical fiber ("Fiberoptic Connection"). However, this is only intended as a non-limiting example embodiment. For example, the optical fiber could be omitted by positioning the light emitter and/or light detector within the rotor (e.g., powering and controlling those elements using the electrical cable). In another example, the electrical cable could be omitted if the OPA lacked electronic phase shifters or other electronic elements. The electrical cable could be used to control phase shifters of the OPA and/or to provide other functionality, e.g., to operate light emitters and/or detectors optically coupled to the OPA, to drive coils of the actuator in examples in which the coils are located on the rotor and the permanent magnets are located on the stator of the actuator, to operate magnetic field sensors and/or encoders used to determine the orientation of the OPA and/or the fields generated by the coils, or to provide some other functionality.

Further description of the disclosed approach is included in the Appendix which is part of the application and is incorporated by reference in its entirety as if fully set forth herein. The Appendix comprises a presentation, entitled "Passive Optical Phased Array". In addition, the references listed herein and in the appended material are also part of the application and are incorporated by reference in their entirety as if fully set forth herein.

II. Example Systems

Figure 11:
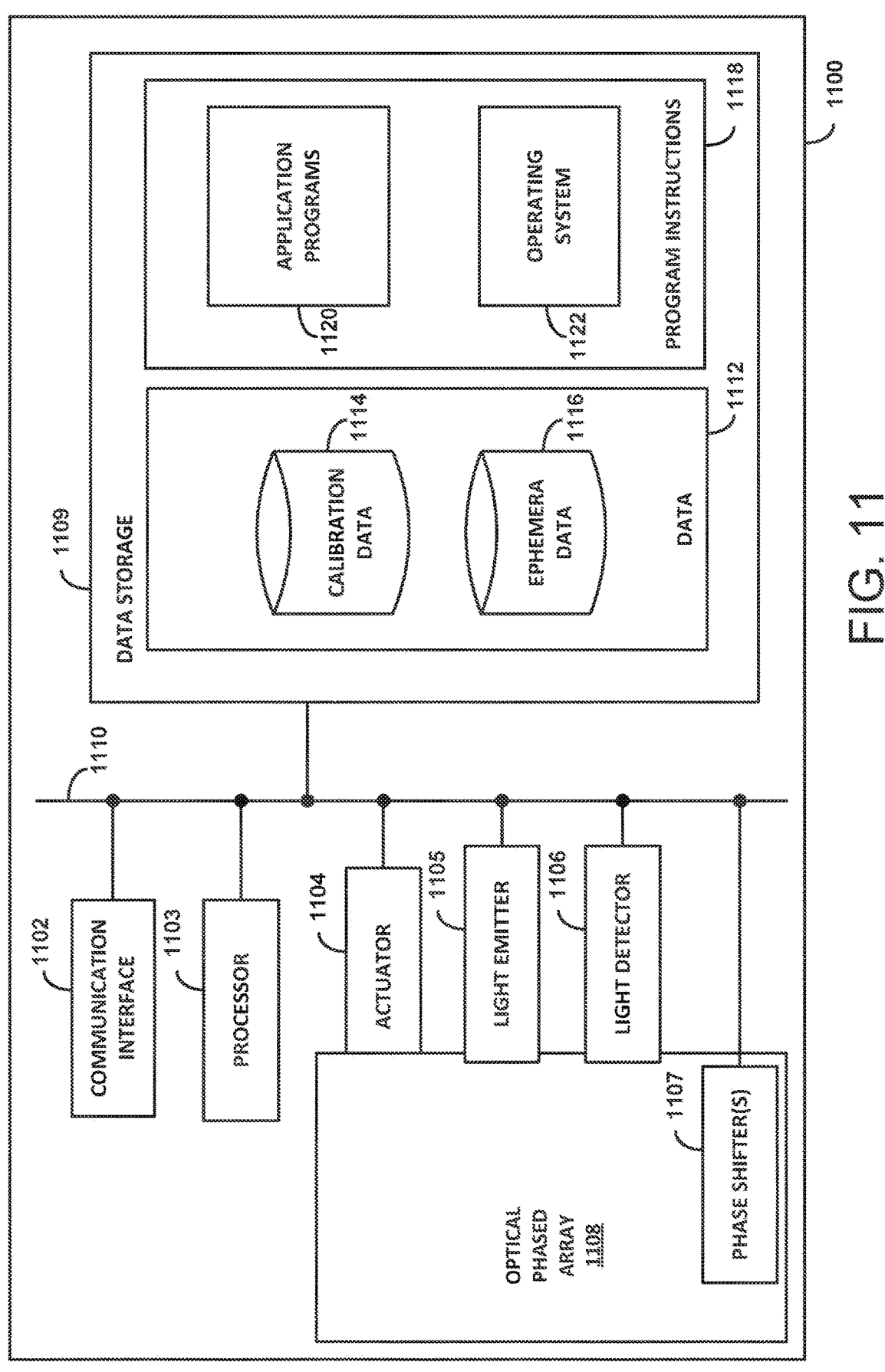
FIG. 11 depicts aspects of an example system.

FIG. 11 illustrates an example system 1100 that may be used to implement the methods described herein and/or that may be or include part or all of one or more systems as described herein. By way of example and without limitation, system 1100 may be a satellite or part of a satellite (e.g., a communications subsystem of a satellite), a cubesat or part of a cubesat or other microsatellite system, an autonomous vehicle or part of an autonomous vehicle, or all or part of some other system in order to provide high-aperture, high-performance line-of-sight optical communications between two or more systems whose relative location and/or orientation may be varying over time. It should be understood that system 1100 may represent a physical device such as a satellite, a particular physical hardware subsystem that could be part of a larger system (e.g., by being mechanically, electrically, thermally, and/or otherwise coupled to a host system), or other combinations of hardware and software that are configured to carry out the functions and/or to incorporate the elements described herein.

As shown in FIG. 11, system 1100 may include a communication interface 1102, a processor 1103, an optical phased array (OPA) 1108, an actuator 1104 configured to mechanically adjust the orientation of the OPA 1108, a light emitter 1105 coupled to the OPA 1108 and configured to provide light to the OPA 1108 thereby emitting a beam of light from the OPA 1108 (e.g., toward a remote satellite in space), a light detector 1106 coupled to the OPA 1108 and configured to receive light from the OPA 1108 thereby receiving beam(s) of light from the environment of the OPA 1108 (e.g., from a remote satellite in space), one or more phase shifters 1107 which may be formed as part of the OPA 1108 or may be separate therefrom, and data storage 1109, all of which may be communicatively linked together by a system bus, network, or other connection mechanism 1110. The optical phased array could include one or more sets of two or more emitter gratings or other static optical emitter elements fed from a common optical feed and having a static, uncontrolled relative phase relationship between each other with respect to the phase of light received via the common optical feed, e.g., as the static OPAs described herein.

Communication interface 1102 may function to allow system 1100 to communicate, using analog or digital modulation of electric, magnetic, electromagnetic, optical, or other signals, with other devices, access networks, and/or transport networks via means other than the OPA 1108. Thus, communication interface 1102 may facilitate circuit-switched and/or packet-switched communication, such as Internet protocol (IP) or other packetized communication. For instance, communication interface 1102 may include a chipset and antenna arranged for wireless communication with a radio access network or an access point. Also, communication interface 1102 may take the form of or include a wireline interface, such as an Ethernet, Universal Serial Bus (USB), or High-Definition Multimedia Interface (HDMI) port, in order to communicate with other systems, e.g., with a master controller or system bus of a satellite of which the system 1100 forms a long-range optical communications subsystem thereof. Communication interface 1102 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1102. Furthermore, communication interface 1102 may comprise multiple physical communication interfaces (e.g., a Wifi interface, a BLUETOOTH® interface, and a wide-area wireless interface).

In some embodiments, communication interface 1102 may function to allow system 1100 to communicate with other devices, remote servers, access networks, and/or transport networks. In some examples, aspects of the communication interface 1102 (e.g., encoders, decoders, multiplexers, timers or oscillators, protocol-managing controllers, or state machines) could be used in concert with the actuator 1104, light emitter 1105, light detector 1106, and/or phase shifter(s) 1107 to effect long-range optical communication with one or more remote systems (e.g., one or more other satellites) via the OPA 1108. Additionally or alternatively, some of all of such functionality may be implemented by the processor(s) 1103.

Processor 1103 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). Data storage 1109 may include one or more volatile and/or non-volatile storage components, such as magnetic, optical, flash, or organic storage, and may be integrated in whole or in part with processor 1103. Data storage 1109 may include removable and/or non-removable components.

Processor 1103 may be capable of executing program instructions 1118 (e.g., compiled or non-compiled program logic and/or machine code) stored in data storage 1109 to carry out the various functions described herein. Therefore, data storage 1109 may include a non-transitory computer-readable medium, having stored thereon program instructions that, upon execution by system 1100, cause system 1100 to carry out any of the methods, processes, or functions disclosed in this specification and/or the accompanying drawings. The execution of program instructions 1118 by processor 1103 may result in processor 1103 using data 1112.

By way of example, program instructions 1118 may include an operating system 1122 (e.g., an operating system kernel, device driver(s), and/or other modules) and one or more application programs 1120 (e.g., functions for performing data collection, data routing and/or forwarding, communication with planetary station(s), or other mission objection activities, functions for determining a location and/or orientation of the system 1100 in space, determining a relative location and/or orientation of another satellite system in space, and operating to optically communicate with the other satellite system via the OPA 1108) installed on system 1100. Data 1112 may include calibration data (e.g., information about the phase-dependence of orientation or other properties of sub-beams emitted from individual static OPA sub-elements of a composite OPA 1108 formed from multiple such sub-elements) 1114 and/or ephemera data 1116 about the time-dependent location and orientation of the system 1100 and/or other systems (e.g., other satellites) with which the system 1100 may communicate.

Application programs 1120 may communicate with operating system 1122 through one or more application programming interfaces (APIs). These APIs may facilitate, for instance, application programs 1120 transmitting or receiving information via communication interface 1102, receiving and/or transmitting data via the OPA 1108, and so on.

Actuator 1104 could include servos, motors, a plurality of magnetic coils and corresponding permanent magnets on a rotor (e.g., a rotor that is diamagnetically levitated from a stator that includes the coils, thereby providing a low- or no-friction magnetic bearing), or some other means for adjusting the orientation of the OPA 1108 relative to the system 110), e.g., to direct a beam of light emitted from/ detected via the OPA 1108 toward another system (e.g., a satellite) with which the system 1100 could communicate optically.

The light emitter 1105 could include one or more lasers, light-emitting diodes, or other light-emitting elements whose time-varying pattern of intensity could be controlled in order to optically communicate, via the OPA 1108, with one or more remote systems. A wavelength and/or aperture of the light emitter 1105 could be specified relative to the OPA 1108 in order to match the light emitter 1105 to the OPA 1108 (e.g., to match with a mode, aperture, wavelength, or other properties of an input waveguide, phase shifter, beam splitter, mode expander, and/or emitter grating of the OPA 1108). For example, the light emitter 1105 could include a 1550 nanometer fiber optical amplifier, or an 850 nanometer semiconductor optical amplifier.

The light detector 1106 could include one or more avalanche photodetectors, photodiodes, avalanche photodiodes, single-photon detectors, or other light-detecting elements that could be operated to detect a time-varying pattern of intensity of light received from one or more remote systems via the OPA 1108, thereby facilitating optical communication. A wavelength and/or geometry of the light detector 1106 could be specified relative to the OPA 1108 in order to match the light detector 1106 to the OPA 1108 (e.g., to match with a mode, aperture, wavelength, or other properties of an input waveguide, phase shifter, beam splitter, mode expander, and/or emitter grating of the OPA 1108). For example, the light detector 1106 could include one or more silicon avalanche photodiodes.

The phase shifter(s) 1107 could include a variety of elements configured to adjust a phase of light emitted from/received by a sub-element of the OPA 1108 (e.g., from/by an individual optical emitter element having a plurality of emitter gratings and a single optical input/output with a static optical phase relationship with each of the emitter gratings) relative to the phase of light received by/emitted from an optical input/output port of the sub-element. For example, the phase shifter(s) 1107 could include thermal phase shifters configured to electrically apply a controlled amount of heating to a waveguide, thereby adjusting an amount of phase delay applied by the waveguide to light passing through the waveguide. The phase shifter(s) 1107 could be integrated into the sub-elements of the OPA 1108 (e.g., a single phase shifter formed as a waveguide and associated heater elements and electrical conductors of a piece of silicon or other material from which the emitter gratings, mode expanders, beam splitters, or other components of the sub-element are also formed), or could be separate from the sub-elements (e.g., discrete optical phase shifters coupled to the sub-elements in one direction and, via a beam splitter, to the light emitter 1105 and/or light detector 1106 in an opposite direction). In some examples, multiple phase shifters, corresponding to respective different wavelengths, could be associated with each sub-element of the OPA 1108. This could be done, e.g., in combination with wavelength-selective filters or other elements in order to allow the direction of a beam of light from the OPA 1108 at a first wavelength (e.g., a transmission wavelength) to vary, slightly from the direction of a beam of light from the OPA 1108 at a second wavelength (e.g., a reception wavelength). This could permit full duplex communication with a satellite that is sufficiently far from the system 1100 that time-of-flight delays between the system 110 and the satellite mean that received optical transmissions are received from a different direction than transmitted optical transmissions are transmitted (e.g., where optical transmissions "lead" the current relative location of the target, and received optical signals are received from the past relative location of the target, in order to account for relative motion and light speed delays).

The optical phased array 1108, light emitter 1105, light detector 1106, phase shifter 1107, and/or elements thereof (e.g., waveguides, mode expanders, tapers, beam splitters, emitters (e.g., grating emitters) could be adapted to provide the communications or other optical beam transmission/reception functionality as described herein for one or more wavelengths. For example, these elements of the system 1100 could be adapted to facilitate communications at one or more wavelengths between 380-2400 nm. In some examples, these elements of the system 1100 could be adapted to facilitate communications at one or more wavelengths between 600-800 nm to provide for more energy-efficient communications by using more efficient light emitters available within that range of wavelengths.

III. Example Methods

FIG. 12 is a flowchart of an example method 1200. The method 1200 includes operating an actuator to direct an optical phased array toward a target (1210). The method 1200 additionally includes, during a first period of time, operating a plurality of phase shifters of the optical phased array to control the direction of an output optical beam of the optical phased array in a first direction relative to the optical phased array (1220). The method 1200 additionally includes optically transmitting first information to the target during the first period of time, wherein optically transmitting the first information to the target during the first period of time includes: (i) operating a light emitter to generate a beam of light that encodes the first information; and (ii) while the optical phased array is directed toward the target, receiving the beam of light generated by the light emitter as an input optical beam by the optical phased array (1230). The method 1200 additionally includes, during a second period of time, operating the plurality of phase shifters to control the direction of the output optical beam in a second direction relative to the optical phased array, wherein the second direction differs from the first direction (1240). The method 1200 additionally includes optically receiving second information from the target during the second period of time, wherein optically receiving the second information from the target during the second period of time includes: operating a photodetector that is optically coupled to the optical phased array to detect the second information that is optically transmitted from the target and received via the optical phased array (1250). The method 1200 could include additional or alternative features.

IV. Enumerated Example Embodiments

Embodiments of the present disclosure may thus relate to one of the enumerated example embodiments (EEEs) listed below. It will be appreciated that features indicated with respect to one EEE can be combined with other EEEs.

EEE 1 is a system that includes. (i) an optical phased array, wherein the optical phased array comprises a first optical expansion element having at least two emitter gratings and a beam splitter, wherein the at least two emitter gratings are configured to receive, via the beam splitter, respective portions of an input optical beam and to emit respective portions of a combined output optical beam of the optical phased array, and wherein the input optical beam has a first aperture that is less than a second aperture of the combined output optical beam, and wherein a relative phase between light emitted from each of the at least two emitter gratings is static; and (ii) a steering actuator mechanically coupled to the optical phased array and configured to adjust an orientation of the optical phased array.

EEE 2 is the system of EEE 1, wherein the steering actuator comprises a magnetic bearing, wherein the magnetic bearing comprises a plurality of magnets and a layer of diamagnetic material configured to repel the plurality of magnets.

EEE 3 is the system of any of EEEs 1-2, wherein the optical phased array comprises a plurality of optical expansion elements that includes the first optical expansion element, wherein each optical expansion element of the plurality of optical expansion elements receives a respective portion of the input optical beam and emits a respective portion of the combined output optical beam.

EEE 4 is the system of EEE 3, further comprising a static phase plate, wherein the static phase plate provides a respective static phase adjustment to light emitted from each of the optical expansion elements of the plurality of optical expansion elements.

EEE 5 is the system of any of EEEs 3-4, further comprising: a plurality of phase shifters, wherein each phase shifter of the plurality of phase shifters is operable to adjust a phase of light emitted from a respective optical expansion element of the plurality of optical expansion elements relative to a phase of the input optical beam; and a controller. The controller is configured to perform controller operations comprising: operating the plurality of phase shifters to control a direction of the combined output optical beam relative to the optical phased array.

EEE 6 is the system of EEE 5, further comprising: a light emitter, wherein the light emitter is configured to generate the input optical beam received by the optical phased array; and a photodetector, wherein the photodetector is optically coupled to the optical phased array such that the photodetector receives, via the plurality of optical expansion elements, light received by the optical phased array from the direction of the combined output optical beam. The controller operations further comprise: operating the steering actuator to direct the optical phased array toward a target; during a first period of time, operating the plurality of phase shifters to control the direction of the combined output optical beam in a first direction relative to the optical phased array; during the first period of time, operating the light emitter to generate a beam of light that encodes first information, thereby optically transmitting the first information to the target; during a second period of time, operating the plurality of phase shifters to control the direction of the combined output optical beam in a second direction relative to the optical phased array, wherein the second direction differs from the first direction; and, during the second period of time, operating the photodetector to detect second information optically transmitted from the target and received via the optical phased array.

EEE 7 is the system of any of EEEs 1-6, further comprising a light emitter, wherein the light emitter is coupled to the optical phased array via a flexible optical fiber.

EEE 8 is the system of any of EEEs 1-7, wherein the input optical beam comprises light having a wavelength between 380 nanometers and 2400 nanometers.

EEE 9 is the system of any of EEEs 1-8, wherein the first optical expansion element comprises a first region and a second region, wherein each of the at least two emitter gratings is associated with a respective tapered optical waveguide via which each emitter grating receives a respective portion of the input optical beam from the beam splitter, wherein the at least two emitter gratings are located within the first region, wherein the tapered optical waveguides and the beam splitter are located in the second region, and wherein a ratio between an area of the first region and an area of the second region is greater than 19:1.

EEE 10 is the system of any of EEEs 1-9, wherein the second aperture of the combined output optical beam is greater than 5 centimeters.

EEE 11 is the system of any of EEEs 1-10, The system of claim 1, wherein the system is a satellite system, and wherein the system further comprises: a light emitter, wherein the light emitter is configured to generate the input optical beam received by the optical phased array; and a controller. The controller is configured to perform controller operations comprising: operating the steering actuator to direct the optical phased array toward a target; and operating the light emitter to generate a beam of light that encodes first information, thereby optically transmitting the first information to the target.

EEE 12 is the system of any of EEEs 1-11, further comprising: a photodetector, wherein the photodetector is optically coupled to the optical phased array such that it receives, via the plurality of optical expansion elements, light received by the optical phased array from the direction of the output optical beam, and wherein the photodetector is an avalanche photodiode.

EEE 13 is a method that includes: (i) operating a steering actuator to direct an optical phased array toward a target, wherein the steering actuator is mechanically coupled to the optical phased array and configured to adjust an orientation of the optical phased array, (ii) during a first period of time, operating a plurality of phase shifters of the optical phased array to control the direction of an output optical beam of the optical phased array in a first direction relative to the optical phased array; (iii) optically transmitting first information to the target during the first period of time, wherein optically transmitting the first information to the target during the first period of time comprises: (a) operating a light emitter to generate a beam of light that encodes the first information; and (b) while the optical phased array is directed toward the target, receiving the beam of light generated by the light emitter as an input optical beam by the optical phased array; (iv) during a second period of time, operating the plurality of phase shifters to control the direction of the output optical beam in a second direction relative to the optical phased array, wherein the second direction differs from the first direction; and (v) optically receiving second information from the target during the second period of time, wherein optically receiving the second information from the target during the second period of time comprises: operating a photodetector that is optically coupled to the optical phased array to detect the second information that is optically transmitted from the target and received via the optical phased array.

EEE 14 is the method of EEE 13, wherein the steering actuator comprises a magnetic bearing and a plurality of coils, wherein the magnetic bearing comprises a plurality of magnets and a layer of diamagnetic material configured to repel the plurality of magnets, and wherein operating the steering actuator to direct the optical phased array toward the target comprises controlling currents provided to the plurality of coils to exert forces onto the plurality of magnets, thereby adjusting an orientation of the optical phased array.

EEE 15 is the method of any of EEEs 13-14, wherein the photodetector is an avalanche photodiode.

EEE 16 is the method of any of EEEs 13-15, wherein the output optical beam has an aperture greater than 5 centimeters.

EEE 17 is the method of any of EEEs 13-16, wherein the optical phased array comprises a first optical expansion element having at least two emitter gratings and a beam splitter, wherein the at least two emitter gratings are configured to receive, via the beam splitter, respective portions of an input optical beam and to emit respective portions of a combined output optical beam of the optical phased array, and wherein the input optical beam has a first aperture that is less than a second aperture of the combined output optical beam, and wherein a relative phase between light emitted from each of the at least two emitter gratings is static.

EEE 18 is the method of any of EEEs 13-17, wherein the beam of light that encodes the first information comprises light having a wavelength between 380 nanometers and 2400 nanometers.

EEE 19 is an article of manufacture including a computer-readable medium, having stored thereon program instructions that, upon execution by a computing device, cause the computing device to perform operations to affect the method of any of EEEs 13-18.

EEE 20 is a system that includes: (i) an optical phased array configured to receive an input optical beam and to emit an output optical beam, wherein the input optical beam has a first aperture that is less than a second aperture of the output optical beam, and (ii) a steering actuator coupled to the optical phased array and configured to adjust an orientation of the optical phased array, wherein the steering actuator comprises a magnetic bearing, wherein the magnetic bearing comprises a plurality of magnets and a layer of diamagnetic material configured to repel the plurality of magnets.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
   an optical phased array, wherein the optical phased array comprises a first optical expansion element having at least two emitter gratings and a beam splitter, wherein the at least two emitter gratings are configured to receive, via the beam splitter, respective portions of an input optical beam and to emit respective portions of a combined output optical beam of the optical phased array, and wherein the input optical beam has a first aperture that is less than a second aperture of the combined output optical beam, and wherein a relative phase between light emitted from each of the at least two emitter gratings is static; and a steering actuator mechanically coupled to the optical phased array and configured to adjust an orientation of the optical phased array.

2. The system of claim 1, wherein the steering actuator comprises a magnetic bearing, wherein the magnetic bearing comprises a plurality of magnets and a layer of diamagnetic material configured to repel the plurality of magnets.

3. The system of claim 1, wherein the optical phased array comprises a plurality of optical expansion elements that includes the first optical expansion element, wherein each optical expansion element of the plurality of optical expansion elements receives a respective portion of the input optical beam and emits a respective portion of the combined output optical beam.

4. The system of claim 3, further comprising a static phase plate, wherein the static phase plate provides a respective static phase adjustment to light emitted from each of the optical expansion elements of the plurality of optical expansion elements.

5. The system of claim 3, further comprising:

a plurality of phase shifters, wherein each phase shifter of the plurality of phase shifters is operable to adjust a phase of light emitted from a respective optical expansion element of the plurality of optical expansion elements relative to a phase of the input optical beam; and a controller, wherein the controller is configured to perform controller operations comprising:

operating the plurality of phase shifters to control a direction of the combined output optical beam relative to the optical phased array.

6. The system of claim 5, further comprising:

a light emitter, wherein the light emitter is configured to generate the input optical beam received by the optical phased array; and a photodetector, wherein the photodetector is optically coupled to the optical phased array such that the photodetector receives, via the plurality of optical expansion elements, light received by the optical phased array from the direction of the combined output optical beam;

wherein the controller operations further comprise:

operating the steering actuator to direct the optical phased array toward a target;

during a first period of time, operating the plurality of phase shifters to control the direction of the combined output optical beam in a first direction relative to the optical phased array;

during the first period of time, operating the light emitter to generate a beam of light that encodes first information, thereby optically transmitting the first information to the target;

during a second period of time, operating the plurality of phase shifters to control the direction of the combined output optical beam in a second direction relative to the optical phased array, wherein the second direction differs from the first direction; and during the second period of time, operating the photodetector to detect second information optically transmitted from the target and received via the optical phased array.

7. The system of claim 1, further comprising a light emitter, wherein the light emitter is coupled to the optical phased array via a flexible optical fiber.

8. The system of claim 1, wherein the input optical beam comprises light having a wavelength between 380 nanometers and 2400 nanometers.

9. The system of claim 1, wherein the first optical expansion element comprises a first region and a second region, wherein each of the at least two emitter gratings is associated with a respective tapered optical waveguide via which each emitter grating receives a respective portion of the input optical beam from the beam splitter, wherein the at least two emitter gratings are located within the first region, wherein the tapered optical waveguides and the beam splitter are located in the second region, and wherein a ratio between an area of the first region and an area of the second region is greater than 19:1.

10. The system of claim 1, wherein the second aperture of the combined output optical beam is greater than 5 centimeters.

11. The system of claim 1, wherein the system is a satellite system, and wherein the system further comprises:

a light emitter, wherein the light emitter is configured to generate the input optical beam received by the optical phased array; and a controller configured to perform controller operations comprising:

operating the steering actuator to direct the optical phased array toward a target; and operating the light emitter to generate a beam of light that encodes first information, thereby optically transmitting the first information to the target.

12. The system of claim 1, further comprising:

a photodetector, wherein the photodetector is optically coupled to the optical phased array such that it receives, via the plurality of optical expansion elements, light received by the optical phased array from the direction of the output optical beam, and wherein the photodetector is an avalanche photodiode.

* * * * *